United States Patent [19]

Boudot et al.

[11] 4,351,821

[45] Sep. 28, 1982

[54] PREPARATION OF GALLIUM OXIDE

[75] Inventors: Bernard Boudot, Paris; Jean Grosbois, L'Isle Adam; Michel Pajot, Salindres, all of France

[73] Assignee: Rhone-Poulenc Industries, Paris, France

[21] Appl. No.: 274,231

[22] Filed: Jun. 16, 1981

[30] Foreign Application Priority Data

Jun. 27, 1980 [FR] France .................................. 80 14308

[51] Int. Cl.³ ............................................... C01G 15/00
[52] U.S. Cl. ..................................................... 423/624
[58] Field of Search ................................. 423/624, 127

[56] References Cited

U.S. PATENT DOCUMENTS 4,081,523  3/1978  Pfundt et al. ......................... 423/624

OTHER PUBLICATIONS

Bohm et al., "Zeit für Anorganishe und Allgemeine Chemie," Band 238, 1938, pp. 350–352.

Laubengayer et al., "Journal of American Chemical Soc.," vol. 61, 1939, pp. 1210–1214.
Milligan et al., "Journal of American Chemical Soc.", vol. 59, 1937, pp. 1670–1674.

*Primary Examiner*—Herbert T. Carter
*Attorney, Agent, or Firm*—Burns, Doane, Swecker & Mathis

[57] ABSTRACT

Gallium oxide, $Ga_2O_3$, well adapted for the manufacture therefrom of garnets, luminophors, and the like, is prepared by (i) admixing, under stirring, a solution of a gallium salt with a base to convert said salt into gallium hydroxide, $Ga(OH)_3$; (ii) aging said gallium hydroxide reaction medium at elevated temperatures to effect precipitation therefrom of a gallium oxide/hydroxide fraction, $GaO(OH)$; (iii) next filtering said gallium oxide/hydroxide fraction from said precipitation medium; (iv) drying and (v) calcining said filtered precipitate to convert same into said gallium oxide, $Ga_2O_3$, with said oxide/hydroxide fraction (vi) being washed either before or after said filtration step (iii).

26 Claims, 2 Drawing Figures

PREPARATION OF GALLIUM OXIDE

BACKGROUND OF THE INVENTION

1. Field of the Invention

The present invention relates to the preparation of gallium oxide, and, more especially, to the preparation of gallium oxide through a gallium hydroxide intermediate.

2. Description of the Prior Art

Processes for the preparation of gallium oxide by precipitation of the corresponding hydroxide, followed by dehydration of such hydroxide, are well known to this art. More particularly, it is known to precipitate the corresponding hydroxide from solutions of gallium sulfate, nitrate or chloride with a base such as NaOH or $NH_4OH$.

Such a process suffers from numerous disadvantages and drawbacks. One, same affords a precipitate which can prove very difficult to filter and wash. Furthermore, the morphology of the resultant product can prove undesirable, especially for the manufacture, via a solid-solid reaction, of garnets based on gallium. For example, gallium oxide prepared by this process can exhibit a substantial acicular phase together with an agglomerated phase.

SUMMARY OF THE INVENTION

Accordingly, a major object of the present invention is the provision of an improved process for the preparation of gallium oxide, one devoid of those disadvantages and drawbacks to date characterizing the state of this art, one which permits excellent filtration of the hydroxide precipitate and one which ultimately provides a homogeneous product consisting of well-separated crystals of gallium oxide which are in the form of small needles and which exhibit excellent reactivity, especially in solid-solid reactions for the manufacture therefrom of garnets based on gallium.

Briefly, the subject process features a precipitation stage under well-defined conditions of admixing and an aging stage under elevated temperatures which effects autogenous production of a gallium oxide/hydroxide intermediate which is thence dried and ultimately calcined to yield the gallium oxide, per se.

DETAILED DESCRIPTION OF THE INVENTION

Figure 1:
FIG. 1 is an electron photomicrograph of crystalline gallium oxide, prepared according to this invention, in accordance with the procedure of the Example 1 which follows.

More particularly according to this invention, gallium oxide is prepared by:

(i) admixing a solution of a gallium salt, under stirring, with a base, to yield gallium hydroxide;
(ii) aging the thus-prepared gallium hydroxide at elevated temperatures;
(iii) filtering therefrom the oxide/hydroxide product thus obtained;
(iv) next drying such oxide/hydroxide; and
(v) thence calcining same to effect preparation of the oxide, per se, and further wherein (vi) either before and/or after the filtration (iii), the oxide/hydroxide product is washed.

The process for the preparation of gallium oxide according to the invention, therefore, comprises a stage (i) in which a solution of a gallium salt is intimately admixed, under stirring, with any suitable base, to provide gallium hydroxide.

The gallium salt solution which is employed is any solution capable of forming gallium hydroxide upon being contacted with a base. The concentration of gallium in the gallium salt solution can vary over wide limits, for example, from 1 to 150 g/l; it is advantageously between 40 and 100 g/l. It is preferred to use a gallium chloride solution, or a gallium nitrate solution.

The base utilized is advantageously ammonia, aqueous ammonia solution, sodium hydroxide, urea, hexamethylenetetramine, ammonium carbamate, or the like. The use of ammonia is preferred.

Throughout the mixing which causes, or effects the precipitation of the gallium hydroxide, the pH of the reaction mixture is advantageously maintained at a value ranging from 6 to 8.5, and preferably from 6.4 to 6.8. Within these ranges, it is advantageous to maintain the pH at a value constant to ±0.1 unit of pH.

According to a preferred embodiment of the process of the invention, the mixing is carried out at elevated temperatures, namely, at temperatures ranging from about 60° to 100° C., and more preferably from 95° to 100° C. Advantageously, such admixing is carried out while the mixture is boiling under reflux.

Consistent with the stage (ii) of the subject process of the invention, the gallium hydroxide $Ga(OH)_3$ is aged to autogenously convert same into gallium oxide/hydroxide GaO(OH).

The aging is carried out under elevated temperatures, namely, at temperatures ranging from about 60° to 100° C. and preferably from 95° C. to 100° C.

During the aging period, the pH of the mixture is maintained at from about 6 to 7, and preferably from 6.5 to 7. More preferably, the pH is regulated to a value within this range, which is maintained constant to ±0.2 unit of pH.

The aging time particularly depends on the conditions under which the gallium hydroxide has been precipitated, and typically ranges from about 1 hour to 10 hours.

In general, in a discontinuous process embodiment, it transpires that for a given amount of precipitate, a precipitation of long duration entails a long aging period in order to homogenize the morphology of the precipitate, while a precipitation of but short duration entails a short aging period, for the same reasons.

Per the stage (iii) according to the invention, the resulting oxide/hydroxide is filtered under pressure, or under suction.

The filter medium employed preferably should have very small pores, on the order of 1 to 5 microns. As is well known to those skilled in the art, the filtration of the oxide/hydroxide "intermediate" can be carried out with addition to the precipitate, either before or after aging, of a flocculating agent which is decomposable at a low temperature.

The washing (vi) of the oxide/hydroxide is carried out according to the process of the invention either before and/or after the filtration operation. The washing is preferably carried out with water, until a wash water having a pH close to neutrality is obtained. The purpose of the washing step (vi) is essentially to remove the salts formed during precipitation; in particular, the washing can be carried out either by passing a certain volume of water through the oxide/hydroxide filter cake, or by resuspending said filter cake.

The process of the invention thus makes it possible, compared to the known prior art processes, to carry out the filtration and washing operations very easily and much more rapidly.

And consistent with the stage (iv) of the subject process, the oxide/hydroxide is then dried in air or in vacuo at temperatures ranging from about 100° C. to 200° C. for about 5 to 15 hours. This drying is preferably carried out in an oven at a temperature of between 110° and 150° C. for a period of between 10 and 12 hours.

According to stage (v) of the process of this invention, the dried product is calcined at a temperature ranging from 800° to 1,400° C., depending upon the nature of the initial salt. Thus, if gallium chloride is used as the starting material, calcination at a temperature of about 1,200° C. proves advantageous to remove all of the chlorides remaining after washing. The calcination time for obtaining gallium oxide, $Ga_2O_3$, is preferably from about 1 to 10 hours and, more especially, ranges from 2 to 4 hours.

The resultant gallium oxide typically has a specific surface area ranging from about 0.5 to 12 m$^2$/g and a density of about 6.0.

Scanning electron microscopy evidences the presence of elementary crystals in the form of needles having a length which generally ranges from about 2 to 30 microns and a width ranging from 1 to 3 microns.

These crystals are well separated and characteristic of a homogeneous product which reacts very well in solid-solid reactions. Thus, a Czochralski print obtained with a non-prereacted mixture of gallium oxide and gadolinium oxide revealed crystals free from defects.

Furthermore, the gallium oxides obtained according to the process of the present invention are admirably well suited for electronic uses for the production of garnets, luminophors, and the like.

In order to further illustrate the present invention and the advantages thereof, the following specific examples are given, it being understood that same are intended only as illustrative and in nowise limitative.

EXAMPLE 1

537 liters of a gallium chloride solution, wherein the gallium concentration was 61.4 g/l, were mixed, under stirring, and in a 3,000 liter stirred reactor, with an ammonia solution having a concentration of 6.6 moles/l, while regulating the pH to a value of 6.7±0.1.

Throughout the precipitation which ensued, the temperature was maintained at 95° C.

The precipitate was then aged at 95° C. for 2 hours. During this aging period, the pH was maintained at the value of 6.7.

The oxide/hydroxide fraction thus obtained was washed with water in three decanting operations using a volume of water equal to the volume of the mother liquors.

The oxide/hydroxide was then filtered off on a suction filter. The speed of filtration was on the order of 3 m$^3$/h/m$^2$.

The filter cake was dried in an oven at a temperature of 130° C. for 15 hours and was then calcined at a temperature of 1,200° C. for 3 hours.

The resultant gallium oxide had a specific surface area of 4 m$^2$/g and a density of 6.0.

A photograph of said resultant product, obtained by scanning electron microscopy, constitutes FIG. 1 of the drawings.

EXAMPLE 2

68 liters of a gallium nitrate solution, wherein the gallium concentration was 112 g/l, were mixed, under stirring, and in a 500 liter stirred reactor, with an ammonia solution having a concentration of 6 N, while regulating the pH to a value of 6.55±0.1.

Throughout the precipitation which ensued, the temperature was maintained at 100° C. The precipitation required 4 hours for completion.

The precipitate was then aged at 98° for 4 hours. During this aging period, the pH was maintained at the value of 6.60.

The oxide/hydroxide fraction thus obtained was filtered off on a suction filter. The speed of filtration was on the order of 2.5 m$^3$/h/m$^2$.

Thereafter, the oxide/hydroxide was washed with water by passing 200 liters of water through the filter cake.

The filter cake was next dried in an oven at 120° C. for 15 hours and was then calcined at 1,250° C. for 10 hours.

The resultant gallium oxide had a specific surface area of 2 m$^2$/g and a density of 6.0.

Figure 2:
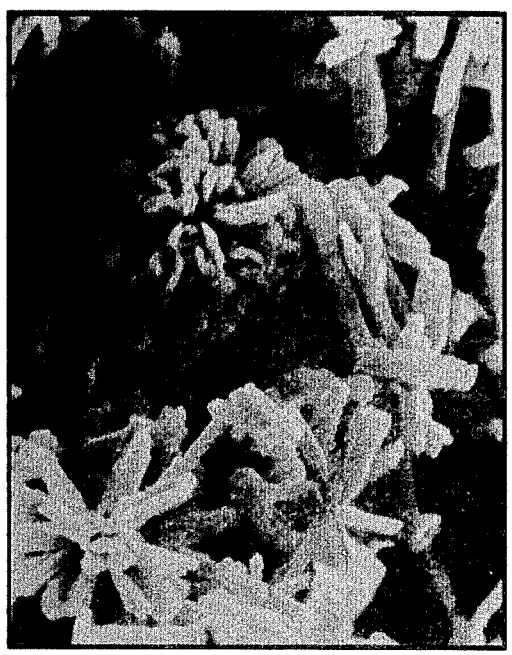
FIG. 2 is another electron photomicrograph of crystalline gallium oxide prepared according to this invention, in accordance with the procedure of Example 2 hereof.

A photograph of said resultant product, obtained by scanning electron microscopy, constitutes FIG. 2 of the drawings.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of gallium oxide, $Ga_2O_3$, comprising (i) admixing, under stirring, a solution of a gallium salt with a base to convert said salt into gallium hydroxide, $Ga(OH)_3$; (ii) aging said gallium hydroxide reaction medium at elevated temperatures to effect precipitation therefrom of a gallium oxide/hydroxide fraction, $GaO(OH)$; (iii) next filtering said gallium oxide/hydroxide fraction from said precipitation medium; (iv) drying and (v) calcining said filtered precipitate to convert same into said gallium oxide, $Ga_2O_3$, with said oxide/hydroxide fraction (vi) being washed either before or after said filtration step (iii).

2. The process as defined by claim 1, the concentration of gallium in said gallium salt solution ranging from 1 to 150 g/l.

3. The process as defined by claim 1, the concentration of gallium in said gallium salt solution ranging from 40 to 100 g/l.

4. The process as defined by claim 2, said gallium salt being gallium chloride or gallium nitrate.

5. The process as defined in claim 2 or 4, said base being ammonia, aqueous ammonia solution, sodium hydroxide, urea, hexamethylenetetramine, or ammonium carbamate.

6. The process as defined by claim 5, said base being ammonia.

7. The process as defined by claim 5, the pH of the reaction medium during the admixing (i) being maintained from 6 to 8.5.

8. The process as defined by claim 7, said pH being maintained from 6.4 to 6.8.

9. The process as defined by claim 7, said pH being maintained constant to within ±0.1 units of pH.

10. The process as defined by claim 7, the admixing (i) being conducted at a temperature ranging from about 60° C. to 100° C.

11. The process as defined by claim 10, the aging (ii) being conducted at a temperature ranging from about 60° C. to 100° C.

12. The process as defined by claim 11, the pH of the aging medium being maintained from about 6 to 7.

13. The process as defined by claim 12, said pH being maintained from 6.5 to 7.

14. The process as defined by claim 12, said pH being maintained constant to within ±0.2 units of pH.

15. The process as defined by claim 12, said washing (vi) being with water.

16. The process as defined by claim 15, said washing (vi) being conducted until the pH of the wash water is essentially neutral.

17. The process as defined by claim 12, said drying (iv) being at a temperature of from about 100° C. to 200° C., for from about 5 to 15 hours.

18. The process as defined by claim 17, said calcining (v) being at a temperature of from about 800° C. to 1400° C., for from about 1 to 10 hours.

19. The process as defined by claim 12, the product gallium oxide, $Ga_2O_3$, having a specific surface area ranging from about 0.5 to 12 $m^2/g$ and a density of about 6.

20. The process as defined by claim 19, said product gallium oxide, $Ga_2O_3$, being crystalline, the crystals being about 2 to 30 microns in length and about 1 to 3 microns in width.

21. The process as defined by claim 10, the aging (ii) being conducting at a temperature ranging from about 95° C. to 100° C.

22. The process as defined by claim 7, the admixing (i) being conducted at a temperature ranging from about 95° C. to 100° C.

23. The process as defined by claim 7, the admixing (i) being conducted while the reaction medium is under boiling reflux.

24. The process as defined by claim 1, said washing (vi) being conducted prior to the filtration step (iii).

25. The process as defined by claim 1, said washing (vi) being conducted after the filtration step (iii).

26. The process as defined by claim 1, a flocculating agent having been added to said oxide/hydroxide precipitate.

* * * * *